United States Patent
Hu et al.

(10) Patent No.: US 8,701,341 B2
(45) Date of Patent: Apr. 22, 2014

(54) CONTROL METHOD AND APPARATUS OF WIND MACHINE FOR PLANT FROST PROTECTION

(75) Inventors: Yong-guang Hu, Jiangsu (CN); Pingping Li, Jiangsu (CN); Xiuhong Wang, Jiangsu (CN); Xiliang Zhang, Jiangsu (CN)

(73) Assignees: Jiangsu University (CN); Jiangsu Yinchunbiya Tea Reseach Institute Co., Ltd. (CN)

( * ) Notice: Subject to any disclaimer, the term of this patent is extended or adjusted under 35 U.S.C. 154(b) by 382 days.

(21) Appl. No.: 13/054,141

(22) PCT Filed: Sep. 5, 2008

(86) PCT No.: PCT/CN2008/001584
§ 371 (c)(1),
(2), (4) Date: Mar. 29, 2011

(87) PCT Pub. No.: WO2010/006473
PCT Pub. Date: Jan. 21, 2010

(65) Prior Publication Data
US 2011/0247263 A1    Oct. 13, 2011

(30) Foreign Application Priority Data
Jul. 16, 2008   (CN) .......................... 2008 1 0124434

(51) Int. Cl.
*A01G 13/08*   (2006.01)
(52) U.S. Cl.
USPC ............................................... 47/2
(58) Field of Classification Search
USPC .............................................. 47/2
See application file for complete search history.

(56) References Cited

U.S. PATENT DOCUMENTS

| | | |
|---|---|---|
| 4,501,089 A | 2/1985 | Cobden |
| 4,753,034 A | 6/1988 | Brown |
| 5,244,346 A | 9/1993 | Fergusson |

FOREIGN PATENT DOCUMENTS

| | | |
|---|---|---|
| JP | 10113076 | 5/1998 |
| JP | 2000050749 | 2/2000 |

(Continued)

OTHER PUBLICATIONS

International Search Report issued Apr. 7, 2009; PCT/CN2008/001584; Int'l File Date: Sep. 5, 2008; 6 pages.

(Continued)

*Primary Examiner* — Frank T Palo
(74) *Attorney, Agent, or Firm* — Schmeiser, Olsen & Watts, LLP

(57) ABSTRACT

This invention relates to control method and apparatus of wind machine for plant frost protection, and belongs to the domain of agro-meteorological disaster monitoring and control. Existing wind machines for plant frost protection only rely on critical damage temperature or wind speed as a condition to start. If there is no thermal inversion, operation of the wind machine will aggravate freezing injury to plants. If the strength of thermal inversion is weak, the effect will be minimal. The feature of this invention is that when temperature at the plant canopy is lower than the critical damage temperature of a certain plant and temperature difference between the top and bottom of the thermal inversion layers exceeds set threshold, wind machine will start automatically. Otherwise it will remain off. The control apparatus mainly consists of sensor 5 at the top of thermal inversion layer, sensor 7 at bottom of thermal inversion layer, and controller 4. This invention of the control of frost protection wind machine ensures rational and effective operation and avoids aggravated freezing risk due to misuse of energy and incorrect operation.

6 Claims, 1 Drawing Sheet

(56) References Cited

FOREIGN PATENT DOCUMENTS

| JP | 2007000096 | 1/2007 | | |
|---|---|---|---|---|
| JP | 2007-129978 | 5/2007 | | |
| JP | 2007129978 A | * 5/2007 | ............. | A01G 13/06 |
| JP | 2008-035775 | 2/2008 | | |
| JP | 2008-118863 | 5/2008 | | |
| JP | 2008-131871 | 6/2008 | | |

OTHER PUBLICATIONS

Written Opinion issued Apr. 7, 2009; PCT/CN2008/001584; Int'l File Date: Sep. 5, 2008; 5 pages.

International Preliminary Report on Patentability issued Jan. 18, 2011; PCT/CN2008/001584; Int'l File Date: Sep. 5, 2008; 6 pages.

Antonio C. Ribeiro et al; Apple orchard frost protection with wind machine operation; Agricultural and Forest Meteorology 141 (2006); pp. 71-81.

Richard L. Snyder et al: Frost Protection: Fundamentals, Practice and Economics, vol. 1, Food and Agriculture Organization of the United Nations Rome, 2005; 240 pages.

Li Pingping et al:Temporal and Spatial Distribution Characteristics of Near Ground Temperature in Tea Farm Under Temperature Inversion in Early Spring; Journal of Ecology and Rural Environment; 2008, 24 (1): 39-42.

Hu Yongguang et al: System Design and Experiment on Elevated Wind Machine for Tea Frost Protection; 4 pages.

* cited by examiner

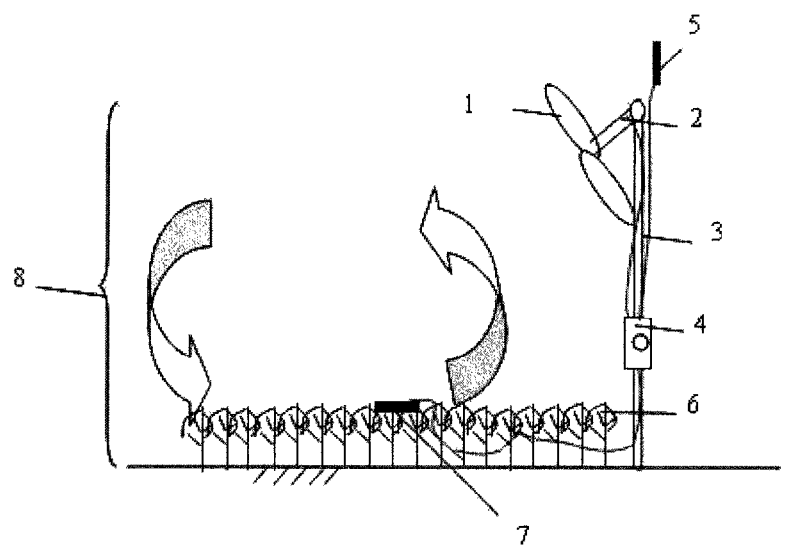

CONTROL METHOD AND APPARATUS OF WIND MACHINE FOR PLANT FROST PROTECTION

TECHNICAL FIELD

This invention belongs to the domain of agro-meteorological disaster monitoring and control. This invention relates to control method and apparatus of wind machine for plant frost protection, particularly automatic control of wind machine based on both meteorological and plant physiological factors: critical temperature at which plants begin to suffer frost damage, and temperature difference between the top and bottom of the thermal inversion layer near ground.

BACKGROUND OF THE INVENTION

Frost damage in early spring and low temperature freezing injury in winter bring about serious losses to agricultural and forestry plants. Frost damage and freezing injury occurs with certain characteristics. The extent of freezing injury depends on low temperature climatic conditions and biological sensitivity of resistance to freezing. Firstly, frost damage usually occurs under thermal inversion conditions during early spring. Plants and the ground absorb large amounts of solar radiation in the daytime, and consecutively radiate heat away from the surface to the atmosphere in the nighttime, so that air temperature near ground falls quickly, resulting in thermal inversion. Secondly, plants are most vulnerable to frost and freezing during the period of frequent late frost (which is also the period of bud burst and leaf spreading). By making full use of distribution characteristics of temperature field under thermal inversion, temperature of this lower layer can be effectively increased to avoid and reduce frost damage, and also advance maturing stage of plant products after convecting thermal inversion layer near ground by wind machines to push upper warmer air downward to plant canopy below. However, determination of the start and stop timing of wind machines remains a key and difficult issue of this domain.

Previous research results show that existing wind machine systems used for plant frost protection only rely on a critical damage temperature, wind speed or an empirical temperature as control condition to start wind machines. For example, Snyder (2005) reported that the startup temperature of frost protection method used for orchards and vineyards in Europe and America is less than 0° C. and wind speed is used as the condition for the start of wind machines: when wind speed exceeds 2.5 m/s, wind machines will be stopped. As for antifrost fans used in Japan for tea plants, temperature of canopy or a lower place in tea field is normally used as a condition to start wind machines. Empirical value of this temperature is about 3° C. Ribeiro (2006) evaluated temperature rise effect after operation of wind machines using the principle of energy balance and he figured out that the temperature at 1.5 m above ground could be chosen for the start of wind machine. USA patents numbered U.S. Pat. No. 4,753,034, U.S. Pat. No. 5,244,346 and U.S. Pat. No. 4,501,089 disclose devices that use centrifugal wind machines to suck lower cold air up to the sky, or use axial flow wind machines to blow upper warm air downward, to prevent frost for fruit trees and grape vines, but corresponding control method and apparatus were not discussed. Japanese patents numbered JP2007000096, JP2000050749 and JP10113076 disclose axial flow wind machines used for tea farms and orchards, but control method and apparatus of the wind machines were not discussed. In China, Hu Yongguang et al. (2007) developed a frost protection system with an axial flow wind machine as its core part and tested wind speed distribution, temperature distribution and temperature rise effect, but control method and apparatus for wind machines were not involved. Li Pingping et al (2008) reported spatiotemporal distribution characteristics of near-ground temperature of a tea farm under thermal inversion conditions in early spring. However, it only provided full demonstration for feasibility of application of elevated frost protection wind machines based on air turbulence method.

In fact, if a temperature or wind speed is used as the condition for system startup, the system will push upper cold air downward to the plants in case of absence of thermal inversion, so that frost damage would be aggravated (incorrect operation), resulting in greater loss. On the other hand, the frost protection effect of wind machine will be less (null operation), and consequently energy will be wasted if the system starts with less thermal inversion temperature difference (difference between temperature above near-ground thermal inversion layer and air temperature at plant canopy).

SUMMARY OF THE INVENTION

Purpose of this invention: Aimed to eliminate the defects of control on start of wind machines for frost protection, which depends only on critical temperature, wind speed, or empirical value of temperature. An effective control method and corresponding apparatus are proposed to avoid incorrect operation and null operation for controlling wind machine.

To this end, this invention of the control method and apparatus of wind machine for frost protection considers both plant biological freezing resistance and specific thermal inversion meteorological conditions. The main contents are as follows:

Timing to start or stop a wind machine will be determined according to 2 factors: plant critical damage temperature and temperature difference between the top and bottom of the thermal inversion layers. The technical scheme is described below:

Said control method of wind machine for frost protection is: when temperature at plant canopy is lower than set critical damage temperature, and temperature difference between the top and bottom of the thermal inversion layers is larger than set threshold, wind machine will be automatically started; otherwise it will remain off. Set temperature difference threshold is 1.5~6.0° C. according to different thermal inversion strengths and installation height of the wind machine.

Said wind machine control device mainly comprises of temperature sensor 5 provided at the top of near-ground atmospheric thermal inversion layer 8, temperature sensor 7 at the bottom of thermal inversion layer 8, and controller 4. Said temperature sensors are used to detect temperatures in real time and transmit them to said controller, which receives temperature information for data analysis and automatically controls start and stop of wind machines according to preset conditions.

For example, according to heights of growth of different types of farming/forestry plants, temperature sensor 5 at the top of thermal inversion layer 8 will be provided in the range 4~10 m above ground, to detect temperature t1 at the top of thermal inversion layer 8 in real time; and temperature sensor 7 will be provided at the bottom of layer 8, i.e. at plant canopy, to detect temperature t2 below layer 8 in real time. t1 minus t2 is the temperature difference through near ground thermal inversion layer. After the temperature collected by sensor 5 and sensor 7 is transmitted to controller 4, comparison with critical damage temperature setting and temperature difference threshold in controller 4 will be automatically performed. If t2 is less than critical damage temperature setting of this plant and measured temperature difference exceeds thermal inversion temperature different threshold, then wind machines will be started. Otherwise they will remain off.

By means of this control method and device, plant canopy temperature can be effectively increased by 1~4° C., to avoid and mitigate frost and freeze damage to plants. As this method and device can reliably ensure operation of wind machines only in case of thermal inversion by comparing temperature difference between the top and bottom of the thermal inversion layers in real time, the possibility of running wind machines can be excluded when there is no thermal inversion, otherwise wind machines could blow cold air toward the plants, aggravating frost and freeze damage and resulting in even greater loss. On the other hand, by setting temperature difference threshold, wind machines will blow warm air at the upper part of the thermal inversion layer to the relatively cold plant canopy under sufficient strength of thermal inversion. Thus protection effect of wind machines decreases when strength of thermal inversion is relatively weak, which would result in a waste of energy, and at the same time would shorten the service life of wind machines. This control method and device of frost protection wind machines can not only effectively avoid or reduce frost and freeze damage to plants, but also increase output of farming and forestry plants, improve the quality, allow earlier harvesting of products, and ensure stable supply of farming and forestry products.

DESCRIPTION OF PREFERRED EMBODIMENTS

Preferred Embodiment 1

Figure 1:
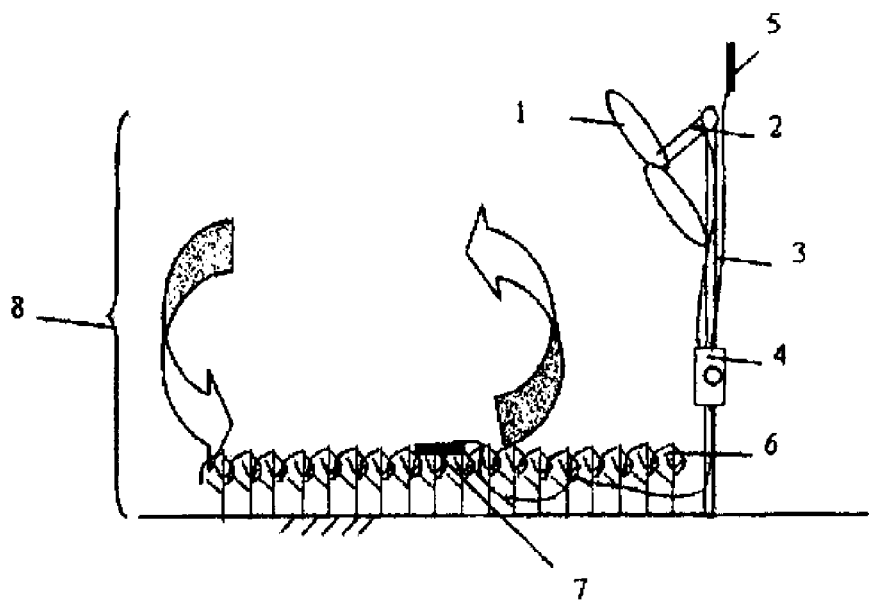
FIG. 1 is a schematic of the wind machine used to mitigate and potentially prevent frost and freeze damage to plants. In this FIGURE, 1 is the axial flow wind machine, 2 is the rotating cradle head, 3 is the vertical column, 4 is the controller, 5 is the temperature sensor at the top of thermal inversion layer, 6 is the plant, 7 is the temperature sensor at the bottom of thermal inversion layer, and 8 is the thermal inversion layer.

The following describes a preferred embodiment of this method and device with control of frost protection wind machine for a tea farm as an example.

Parameters of the used frost protection wind machine: rotary diameter of 900 mm, rotation speed of 998 r/min, installed height of 7 m, installed dip of 20°, head swaying range of 90°, swaying period of 2 min, and driving motor power of 3 KW.

Control device of frost protection wind machines mainly includes the two temperature sensors 5 and 7, controller 4, housing, AC contactor, and electric leakage protector. In the system shown in FIG. 1, the wind machine 1 is connected to vertical column 3 via rotating cradle head 2. Temperature sensor 5 is installed at height of the wind machine 1 at the top of thermal inversion layer 8, and away from the wind machine 1 to avoid this sensor being affected by the wind machine after it starts. The other temperature sensor 7 is installed at the bottom of thermal inversion layer 8 and at height of plant canopy 6 (about 1.2 m) in the scope of action of the wind machine 1. Since tea plants are subject to slight freezing injury when temperature is lower than 2° C. critical damage temperature is set to 2° C. in controller 4. Considering that new tea buds and leaves in early spring are extremely vulnerable to freezing, temperature difference threshold is set to 2° C.

On early spring evenings when thermal inversion occurs, frost is extremely likely. When temperature sensor 7 detects that temperature at the tea canopy is 1.5° C., and temperature at 7 m is 5.2° C., the wind machine 1 is found running and no frost occurs on tea plants. During operation, once temperature at the tea canopy is detected as exceeding 2° C., the wind machine 1 automatically stops. At dawn of the following day as thermal inversion layer 8 disappears, temperature difference between the top and bottom of the thermal inversion layers is less than threshold of 2° C., and the wind machine automatically stops.

Preferred Embodiment 2

The following continues to describe preferred embodiment of this method and device with control of frost protection wind machines for an apple orchard as an example.

Parameters of used frost protection wind machines: rotary diameter of 2000 mm, rotation speed of 730 r/min, installed height of 10 m, installed dip of 20°, head swaying range of 180°, swaying period of 4 min, and driving motor power of 15 KW.

Compositions of control device and temperature sensors setting method of this frost protection wind machines are the same as preferred embodiment 1. Particular parameters are as follows:

Since apple trees can be as high as 4 m and have relatively strong resistance to freezing, critical damage temperature of frost and freeze damage is about −1.5° C. Therefore, critical damage temperature for the apple tree canopy should be set to −1.5° C., and height of temperature sensor 7 at the bottom of thermal inversion layer is determined to be 4 m. Temperature difference can be set to 3° C. and temperature sensor 5 at the top of thermal inversion layer is installed at 10 m.

This invention is not limited to these disclosed implementation schemes and will cover the range described in the patent as well as variations and equivalent changes in the scope of claims.

What is claimed is:

1. A control method for controlling one or more wind machines used to mitigate and potentially prevent frost and freeze damage to a plant, comprising:
   automatically starting the one or more wind machines when a temperature at a plant canopy is lower than a critical damage temperature, and a temperature difference through a thermal inversion layer exceeds a certain threshold; and
   automatically stopping the one or more wind machines if the temperature at the plant canopy is not lower than the critical damage temperature or if the temperature difference through the thermal inversion layer does not exceed the certain threshold.

2. The control method of claim 1, wherein the certain threshold is 1.5~6.0° C.

3. The control method of claim 1, wherein a control device of the control method includes a first temperature sensor at a top of near-ground atmospheric thermal inversion layer, a second temperature sensor at a bottom of thermal inversion layer, and a controller, further wherein the first and second temperature sensors are used to detect temperature in real time and transmit temperature information to the controller, the controller being used for sensing temperature, data analysis and automatic control of the start or stop of the one or more wind machines according to current conditions.

4. The control method of claim 3, wherein the first temperature sensor at the top of near-ground thermal inversion layer is installed within a range of 4~10 m above ground.

5. The control method of claim 3, wherein the second temperature sensor at the bottom of thermal inversion layer is installed at the plant canopy.

6. The control method of claim 3, wherein the current conditions are:

if the temperature at the plant canopy temperature is lower than the critical damage temperature and the temperature difference through the thermal inversion layer exceeds the certain threshold, the one or more wind machines will start.

\* \* \* \* \*

UNITED STATES PATENT AND TRADEMARK OFFICE
CERTIFICATE OF CORRECTION

PATENT NO. : 8,701,341 B2
APPLICATION NO. : 13/054141
DATED : April 22, 2014
INVENTOR(S) : Tong-guang Hu et al.

It is certified that error appears in the above-identified patent and that said Letters Patent is hereby corrected as shown below:

In the Drawing

Delete drawing sheet containing fig. 1, and substitute the attached drawing sheet therefor.

Please insert --FIG. 1-- under figure.

Signed and Sealed this
Twenty-ninth Day of July, 2014

Michelle K. Lee
*Deputy Director of the United States Patent and Trademark Office*